United States Patent
Glasgow

[11] 3,902,837
[45] Sept. 2, 1975

[54] CRUMB CRUST FORMER

[76] Inventor: Luther Ellis Glasgow, 2122 Lakeshore Ave., Oakland, Calif. 94606

[22] Filed: May 18, 1973

[21] Appl. No.: 361,654

[52] U.S. Cl. .............................. 425/458; 425/218
[51] Int. Cl.² ......................................... A47J 43/00
[58] Field of Search ............ 425/458, 87, 218, 267, 425/263, 469, 457

[56] References Cited
UNITED STATES PATENTS

| | | | |
|---|---|---|---|
| 774,918 | 11/1904 | Mary | 425/267 X |
| 1,001,622 | 8/1911 | Crane | 425/263 |
| 1,028,549 | 6/1912 | Crossley | 425/263 |
| 1,472,229 | 10/1923 | Plempel | 425/218 |
| 1,902,047 | 3/1933 | Schantz | 425/218 |
| 2,642,009 | 6/1953 | Orfitelli | 425/218 |
| 3,307,502 | 3/1967 | Armour | 425/267 X |
| 3,451,359 | 6/1969 | Glasgow | 425/263 |
| 3,716,319 | 2/1973 | Norman | 425/458 X |
| 3,734,674 | 5/1973 | Steele | 425/458 |

FOREIGN PATENTS OR APPLICATIONS

| | | | |
|---|---|---|---|
| 853,153 | 11/1960 | United Kingdom | 425/263 |

*Primary Examiner*—Francis S. Husar
*Assistant Examiner*—David S. Safran
*Attorney, Agent, or Firm*—Flehr, Hohbach, Test, Albritton & Herbert

[57] ABSTRACT

A crumb crust former for use with a wall-equipped container such as a pie or cake pan to construct a pie or cake crust therein from a mass of crumb crust material provided within the container for this purpose. The crust former includes a forming head adapted to rotate about the center of such container to distribute the mass of crum crust material therein usually along both the bottom and sidewalls of the container to construct such crust. The head is carried by support structure engageable with the upper edge portion of the container sidewall to positionally relate the forming head thereto in a predetermined spatial relationship with the bottom and sidewalls of the container necessary for construction of the crust therealong. The support structure enables the head and container to be relatively rotatable, and means are included in the crust former for preventing accumulation of crumb crust material along the upper edge portion or rim of the container.

25 Claims, 10 Drawing Figures

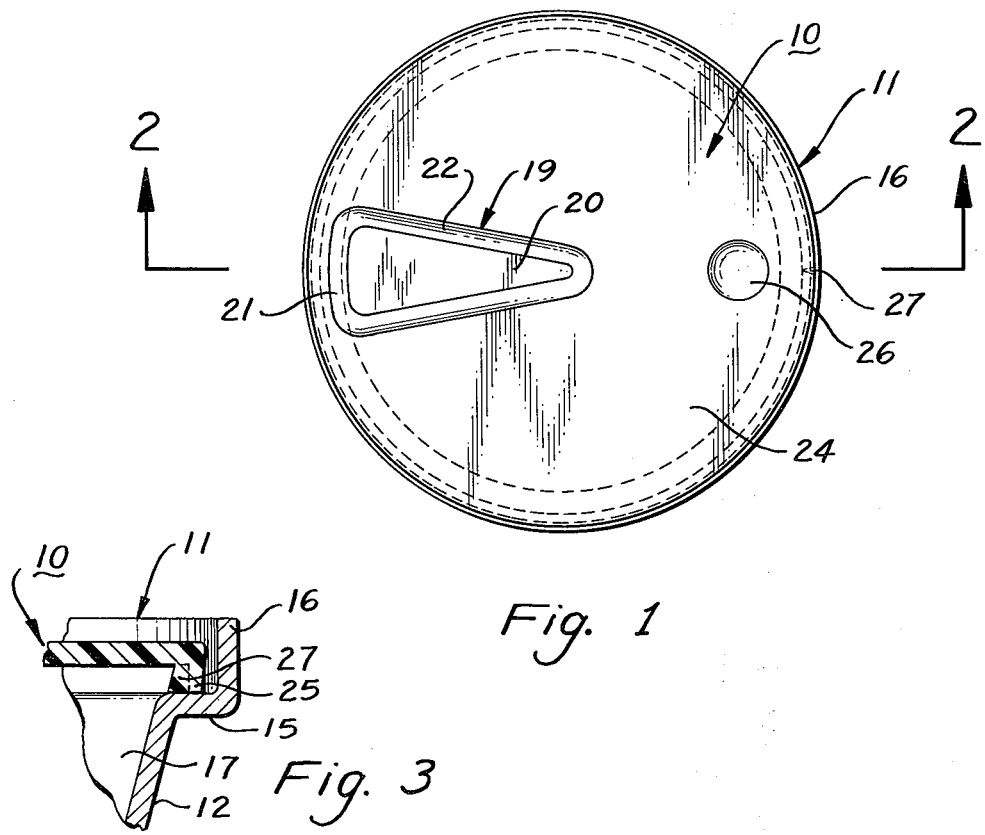
Fig. 1
Fig. 3
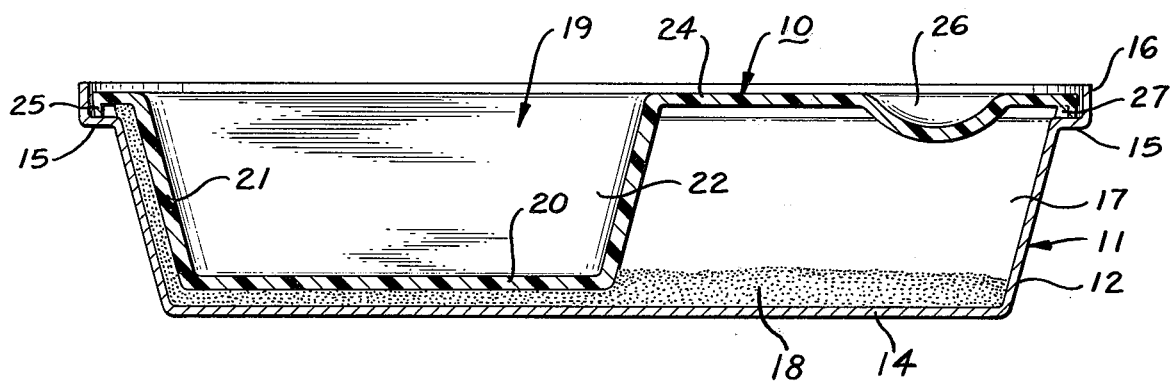
Fig. 2
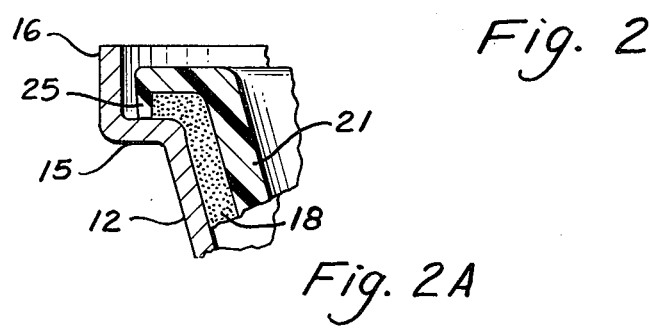
Fig. 2A

PATENTED SEP 2 1975 3,902,837

CRUMB CRUST FORMER

This invention relates generally to the art of making crusts for food products and, more particularly, to apparatus for forming crusts for food products, either baked or chilled, such as pies, cakes, tarts, and the like. In still more particular reference, the present invention is concerned with a crust former for constructing crusts in pie, cake, or tart pans and like containers from a mass of crust material placed within the container for this purpose.

Food products, heated or chilled, such as pies, cakes, tarts, etc., are ever popular food items, and for this reason are produced in great quantities both commercially in large scale production for subsequent retail use and sale; and domestically, essentially on an individual basis, in the kitchen of the homemaker. A component of such baked and/or refrigerated goods are the crusts that are invariably present along the bottom and/or sidewalls of any such food product, and although various types of crusts may be provided, one that is often preferred is known as a "crumb crust." Crusts of this type constitute an admixture of a crumb base (graham cracker or crushed grain flakes, for example) and a binder that enables the admixture to be worked and to maintain a crust shape imposed thereon.

As would be expected, apparatus of various structural and functional varieties has been proposed to facilitate and mechanize the work of forming such crusts including compression mechanisms in which a quantity of dough or other crust material is compressed between two die elements to force the crust material into the shape of the forming dies; rotatable mechanisms in which centrifugal force of sufficient magnitude is developed to cause the mass of crust material to spread outwardly from a spatially fixed center; and combinations of these two techniques in which both compressive force and centrifugal force are exerted against a semifluid crust material to enforce a predetermined crust shape thereon. Apparatus of this type may have considerable utility in commercial application, but is not suitable for domestic use, and whereas it tends to function in a satisfactory manner with crust materials of a cohesive character such as pastry dough, it has undesirable limitations as respects other crust materials that may be crumbly rather than cohesive in character in either a domestic or commercial application.

I have heretofore proposed a device for use in forming crumb crusts within pie pans and like containers, and such device constitutes the subject matter of my U.S. Pat. No. 3,451,359 which issued June 24, 1969. The crumb crust shaper disclosed in such patent produces satisfactory results in most instances, and demonstrates a functional principle of undisputed integrity. I have nevertheless simplified and improved the basic device disclosed in that patent, and a general object of the present invention is to provide an improved crumb crust former especially suited for use with crumb crust materials to construct crusts therefrom along the bottom and/or sidewalls of pie, cake, or tart pans and like containers.

Additional objects, among others, of the present invention are in the provision of an improved crust former of the character described that is structurally simple, functionally reliable, and easy to use, thereby making it especially suitable for domestic application as well as being adaptable for commercial environments; that is cooperative with a pie, cake, or tart pan or like container having an annular perimetric sidewall equipped adjacent its upper end with an outwardly projecting annular rim that may terminate in an upwardly oriented annular flange (raw or hemmed) or in a head (full or raised) so as to be positionally related in a positive manner to such container and thereby consistently produce crust of desired uniformity, thickness, and surface smoothness; that includes a forming head and support structure therefor which carries the head, directly or indirectly, in the sense of supporting, positioning, or otherwise relating the same to a container for relative rotation; that includes means for wiping or otherwise preventing accumulation of crumb crust material along the rim or upper edge portion of the container sidewall so that the crust constructed by the former will have a predetermined height and will be clean and sharply defined along the upper edge thereof; and that is easily gripped and held by one using the former who, because of its construction, can rotate the same selectively in either angular direction relative to the container to distribute a mass of crumb crust material therein along the bottom and/or sidewalls thereof to construct a crust in juxtaposed covering relation therewith.

Additional objects and advantages of the invention, especially as concerns particular features and characteristics thereof, will become apparent as the specification continues.

Embodiments of the invention are illustrated in the accompanying drawings, in which:

FIG. 1 is a top plan view of a crumb crust former embodying the invention in operative association with a container;

FIG. 2 is a transverse sectional view of the former and container taken along the line 2—2 of FIG. 1;

FIG. 2a is an enlarged broken transverse sectional view of an upper edge portion of the structure illustrated in FIG. 2 but with the crumb crust material overlying the rim of the container.

FIG. 3 is an enlarged broken transverse sectional view of an upper edge portion of the combination shown in FIG. 2 illustrating the wiper for removing crust material from the rim of the container;

Figure 4:
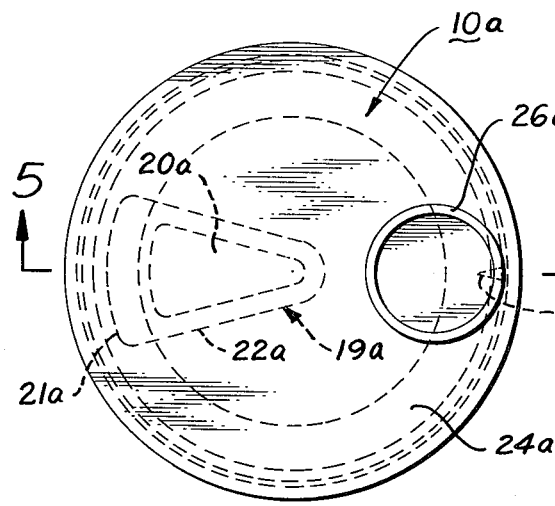
FIG. 4 is a top plan view of a modified former shown in operative association with another type of container.

The crumb crust former embodying the present invention is adapted for use with a pie pan or like container, and in FIGS. 1 and 2 the former 10 is shown in operative association with a container 11. As respects the present invention, the container 11 may be essentially conventional, and it has an annular perimetric sidewall 12 extending upwardly from a relatively flat bottom wall 14. The sidewall 12 is equipped adjacent the upper edge thereof with an outwardly projecting annular rim 15 terminating in an upwardly oriented annular flange 16. The flange 16 may be a raw or hemmed flange, or a raised or full bead. The sidewall 12 inclines upwardly and outwardly so that the diameter of the container 11 is somewhat larger adjacent the inner edge of the rim 15 than it is adjacent the bottom wall 14. The angle of inclination of the sidewall may vary considerably, and as will be evident hereinafter, the crumb crust former 10 can be used with containers having sidewalls that very closely approximate a vertical orientation relative to the bottom wall 14.

The rim 15 of the container 11 is substantially planar and generally parallels the planar bottom wall 14. The flange 16 is essentially vertical in the particular container 11 being considered, and it therefore defines with the rim 15 an included angle of approximately 90°. The lateral width of the rim 15 may vary substantially, as will be evident hereinafter, and within reasonable limits the width thereof is not pertinent to the present invention. The container 11 may be fabricated from any suitable material, usually a relatively good heat conductor such as metal. As a specific example, the container 11 may be an aluminum foil structure integrally formed throughout and of the type commonly in use for packaging baked, refrigerated, or frozen food items. Thus, the container is open at its top, and defines a chamber 17 adapted to receive materials therein and, as respects the present invention adapted to receive a mass of crumb crust material 18, as shown in FIG. 2.

The crumb crust material 18 is not per se germane to the present invention, and it may constitute an admixture of variant ingredients depending upon the exact taste experience desired. In general terms it may be said to include an admixture of crumbs and a binder having a consistency somewhat analogous to that of damp sand which can be compacted and will retain a form imposed thereon. Crusts for pies and cakes made from ingredients of this type are well known, and a specific example constitutes graham cracker crumbs mixed with shortening as a binder. As explained in detail hereinafter, the former 10 is effective to distribute the mass of crumb crust material 18 along the bottom and sidewalls 14 and 12 of the container to construct a crust therein.

The crumb crust former 10 includes a forming head 19 adapted to be rotated about the center of the container 11 to distribute the mass of crumb crust material 18 therein along the bottom and sidewalls 14 and 12 to construct a crust in covering relation therewith, as illustrated along the left-hand side of the container shown in FIG. 2. The head 19 has a generally planar bottom wall 20 and an upwardly extending sidewall 21 respectively adapted to be disposed in spaced facing relation with the bottom and sidewalls 14 and 12 of the container 11. The head 19 further includes closure wall structure 22 extending upwardly from the bottom 20 to serve therewith as a crumb spreader. In the form shown, the closure wall structure 22 extends upwardly to the same elevation as that of the sidewall 21, and it is continuous therewith extending inwardly therefrom along generally radial lines toward the center of the former from each terminus of the sidewall 21. Thus, the closure wall structure 22 is generally perimetric having a somewhat triangularly shaped configuration defining with the sidewall 21 a hollow open space within the head 19.

This construction of the head 19 enables the same to be rotated in either angular direction with respect to the container 11 so as to distribute the crumb mass 18, as will be described in detail hereinafter. The closure wall structure 22 inclines downwardly and inwardly, as is most evident in FIG. 1, so that the radial width of the head 19 is somewhat greater adjacent the upper edge thereof than it is adjacent its bottom wall 20. The bottom wall 20 of the head 19 is of sufficient length to extend along generally radial lines from adjacency with the container sidewall 12 through the container center portion to a location therebeyond. Thus, the length of the head 19 along the bottom wall 20 is of the general order of the radius of the container 11 along the bottom wall 14 thereof, and in any case the head should extend at least slightly past the center of the container so that the entire crumb mass therewithin will be evenly spread. A head 19 not having such dimensional relationship will tend to leave a mound of crumbs at the center of the container.

The head 19, as is clearly evident in FIG. 1, has an angular length that is less than 360°, and in the embodiment of the invention being considered, the angular width of the wedgeshaped head at the sidewall 21 thereof is generally of the order of 30°. This specific dimension is not critical, and is given by way of a specific exemplification. Although the head 19 is hollow, it may be solid, and it need not be symmetrical about a radial center line therethrough (as previously stated) although such symmetry enables the head to be rotated in either angular direction. Further, in certain embodiments of the invention the closure wall structure 22 need not extend to the upper edge of the crust former 10 but may terminate adjacent the bottom wall 20 as long as it is of sufficient height to serve as a plow or spreader for the crumb mass 18. It will be appreciated that extending the closure wall to the upper edge of the crust former 10 prevents crumb materials from entering the interior of the head 19. In other embodiments of the invention the bottom wall 20 may be open, the lower edge of the closure wall structure 22 forming the bottom wall of the head. In the embodiment of the invention under consideration, it will be apparent that the entire forming head 19 is of integral or unitary construction, and that the sidewall 21 thereof conforms to the curvature of the container wall 12 and is rounded at its angularly spaced edges so as to facilitate movement of crumb crust material into the space intermediate the facing sidewalls 12 and 21 of the container 11 and forming head 19.

The crumb crust former 10 further includes support structure that carries the head 19 and is engageable with the upper edge portion of the container sidewall 12 to positively relate the forming head to the container and thereby establish the spatial relationship of the bottom and sidewalls 20 and 21 of the head with the respectively facing bottom and sidewalls 14 and 12 of the container. In the former 10 under consideration, such support structure takes the form of a cover 24 that engages the lip 15 through a depending flange 25. The flange 25 generally parallels the flange 16 and is located within the interior thereof in substantially contiguous relation therewith to prevent significant lateral play therebetween. In the form shown, the flange 25 is a perimetric annular flange having an arcuate length of 360°. Similarly, and as is evident in FIG. 1, the cover 24 is also continuous or of 360° so that the entire crust former 10 including the head 19 and cover 24 completely overlies and closes the container compartment 17.

The flange 25 is relatively narrow being substantially smaller in lateral extent than the container rim 15 so that the slidable engagement of the flange on the rim has a relatively low frictional inhibition to relative movement therebetween. In this respect, the entire crust former 10 is rotatable relative to the container 11, and to facilitate rotational displacements of the former with respect to the container, the cover 24 has a recess or depression 26 located in spaced relation with the head 19 inwardly of the flange 25 and container sidewall 12 and along the radial axis of the head. The recess 26 enables one to place a digit therein to rotate the crust former in its entirety relative to the container 11 to distribute the mass of crumb crust material 18 and construct a crust therefrom.

Accordingly, relative rotation between the head 19 and container 11 may be effected in the crust former 10 by rotating the entire former with respect to the container (the container may be rotated about the former, if desired). Such rotation may tend to cause the crust material to collect along the rim 15, as shown in FIG. 2a, and the former 10 is provided with means for preventing accumulation of crumb crust material along the rim. Such means comprise a wiper 27 engageable with the rim 15 to sweep the same upon relative rotation of the head 19 and container to remove crust crumb accumulations, thereby leaving the rim 15 relatively clean, as shown in FIG. 2. To facilitate return to the container 11 of the excess crust material that may tend to accumulate in front of the wiper 27 as it sweeps the rim 15, the wiper tapers inwardly and in the former 10, it is triangularly shaped, as seen in FIG. 1, and extends inwardly from the depending flange 25 toward the inner edge of the rim 15. The inner terminus of the wiper 27 may be inclined so as to substantially parallel the angular disposition of the container sidewall 12, as is most evident in FIG. 3, although such angular disposition of the wiper is exaggerated owing to the limitations imposed by draft requirements where the former 10 is a molded product.

As respects the construction of the crust former 10, it may be constituted of any number of materials including natural and synthetic materials such as metal, paperboard, laminates such as paper and resin plastic films, synthetic plastics such as polystyrene and polyethylene, etc. In the particular embodiment of the invention under consideration, the crust former 10 is constituted of a synthetic thermoplastic material (polystyrene) molded integrally in the configuration shown. The crust former 10 may be opaque, colored, tinted, or transparent, as in the case of the particular embodiment of the invention being considered herein.

In use of the crust former 10, a predetermined mass of crust material 18 is placed within the container 11 along the bottom wall 14 thereof. The mass of material 18 need not be distributed along the bottom wall 14, but placed in a mound therein at the center of the container bottom wall 14. The crust former 10 is then positioned upon the container 11 with the depending flange 25 of the former seated upon the lip 15 of the container. The entire crust former 10 and container 11 are then rotated relative to each other through several complete rotations (four to six usually being sufficient) which is effective to cause the mass of material to be distributed uniformly to a predetermined thickness along the container bottom wall 14 and further causes the material to climb upwardly along the container sidewall 12 to completely cover the same. The wiper 27 prevents material accumulation along the rim 15, and following the several required rotations, the entire crust former 10 is removed which leaves the container with a crust of uniform thickness and distribution constructed along the interior thereof.

As previously stated, the crust former 10 can be rotated in either angular direction relative to the container 11 because of the symmetrical construction of the head 19. Therefore, one using the crust former may use it in the manner most natural and convenient for his particular aptitudes. Once the crust is constructed, the container may then have the filling added thereto which, in the ordinary instance, will be pie, cake, or tart filling as, for example, a cheesecake filling. The entire container may then be placed within an oven and baked at the requisite temperature for the necessary time period to completely cook the content, or placed in a refrigerator to refrigerate the same, or both. Thereafter, the cooked or refrigerated product may be left within the container either in covered or uncovered condition depending upon the requirements of any user.

Figure 5:
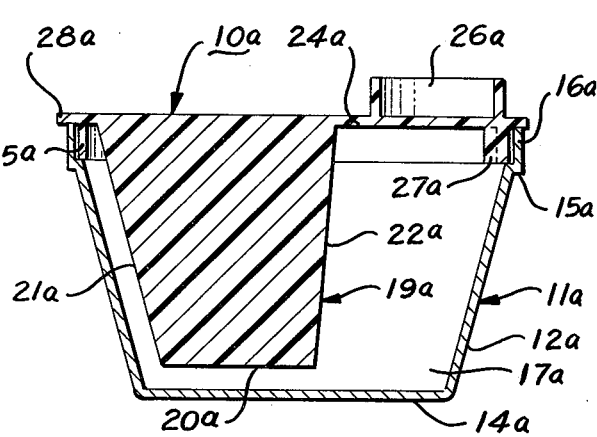
FIG. 5 is a transverse sectional view taken along the line 5—5 of FIG. 4.

The modified embodiment of the invention illustrated in FIGS. 4 and 5 departs only in minor respects from the embodiment of the invention heretofore considered, and because of the general similarity of components of both the container and crust former, the same numerals are used to identify respectively corresponding elements except that the suffix "a" has been used for purposes of differentiation.

Comparing the container 11a with the container 11 heretofore described, it will be apparent that the diameter of the container 11a is somewhat smaller and the vertical dimension is, but not necessarily, greater. The angular inclination of the perimetric annular sidewall 12a is substantially the same as that of the sidewall 12, but the rim 15a is considerably narrower in the lateral direction. The flange 16a is proportionally greater in vertical extent than the aforementioned rim 16. Otherwise, the containers 11a and 11 are essentially analogous in structure and function. Similarly, the crust formers 10a and 10 are analogous, and the head 19a is formed integrally with the support structure 24a which takes the form of a plate or cover having an angular extent of 360° which is able to overlie the entire container 11a. Rather than recess or depression 26 formed along the support structure, the cover 24a is equipped with an upwardly extending finger grip 26a useful in imparting rotational displacements to the crust former 10a relative to the container 11a.

Whereas the support structure 24 of the crust former 10 engaged the container 11 entirely through the depending flange 25, the support structure 24a not only has a depending flange 25a that rides upon the narrow rim 15a, but it also has an outwardly extending edge portion or flange 28a that overhangs and seats upon the upwardly extending flange 16a of the container. Accordingly, the crust former 10a is supported by substantial engagement of both the depending flange 25a and outwardly extending flange 28a with the upper end portion of the container wall 12a and, in particular, with the rim 15a and flange 16a thereof, respectively. A wiper 27a extends inwardly from the flange 25a to limit the height of the crust formed along the container sidewall 12a intermediate such sidewall and the facing sidewall 21a of the head 19a. It will be appreciated that the flange 25a essentially constrains the crust former 10a against laterally displacement relative to the container and the flange 28a establishes the vertical constraint so that the combined actions of the depending flange 25a and the outwardly extending flange 28a establish the desired spatial relationship between the head 19a and container walls 12a and 14a. Accordingly, the flange 25a may be located along exterior of the flange 16a and perform the same function.

The container 11a and crust former 10a are used in the manner heretofore described with respect to the embodiment of the invention shown in FIGS. 1 through 3. That is to say, a predetermined or measured quantity of crumb crust material is placed within the compartment 17a of the container, the crust former 10a is placed in position as shown in FIG. 5, and the entire crust former is then rotated relative to the container for several complete revolutions so as to construct a crust by distributing the material uniformly along the bottom wall 14a and sidewall 12a of the container. When the crust is adequately developed, the crust former 10a is removed and the crust-equipped container 11a processed in a conventional manner, as heretofore explained.

Figure 6:
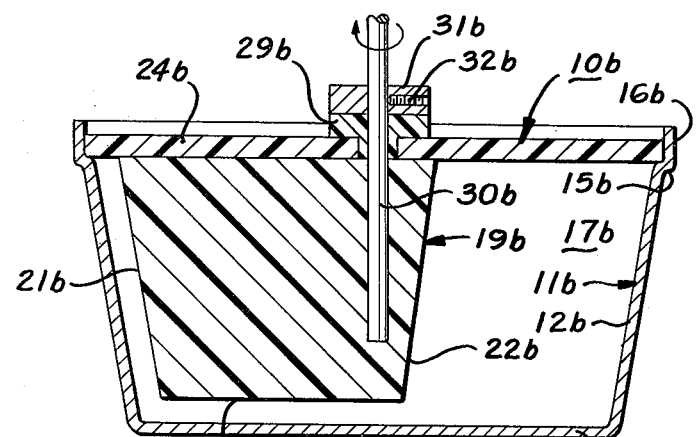
FIG. 6 is a transverse sectional view of a further modified embodiment of the crumb crust former illustrated in operative association with still another type of container.

The further modified embodiment of the invention illustrated in FIGS. 6 and 7 again corresponds in essentials to the embodiments of the invention heretofore considered, and the same numerals are used to identify respectively corresponding elements except that the suffix "b" has been added for purposes of differentiation. The container 11b is somewhat smaller than the container 11 heretofore described, and the sidewall 12b has a somewhat more vertical inclination, but neither is necessarily so. The rim 15b is relatively narrow as in the case of the rim 15a shown in FIG. 5, but is not necessarily so.

The crust former 10b is generally similar to the crust formers heretofore considered except that the head 19b is not formed integrally with the support structure 24b and is rotatable relative hereto. In this reference, the support structure 24b is provided therealong with a bearing 29b through which extends a drive shaft 30b embedded within the head 19b in alignment with the center of the container 11b and constrained against rotation with respect to the head. The drive shaft 30b forms a part of the total support structure for the head 19b, and it is journaled for rotation in the bearing 29b. Upon rotation, the shaft 30b rotatably drives the head 19b relative to the support 24b and relative to the container 11b. The vertical position of the drive shaft 30b in relation to the container 11b, and therefore the vertical position of the head 19b in relation thereto, is established by a stop 31b that seats upon the upper surface of the bearing 29b and is fixed to the drive shaft as, for example, by means of a set screw 32b.

The support structure 24b can include a narrow strip or a continuous cover, the latter being present in the specific embodiment of the invention under consideration, and it may, as it does in the form show, seat within flange 16b of the container and directly upon the narrow rim 15b thereof. Therefore, the strip or cover portion of, the support structure 24b engages the container 11b throughout a sufficient area to constrain the same against rotation as the head 19b is rotatably driven in either direction via the shaft 30b to distribute crust material (not shown) within the container 11b to construct a crust therewithin, as previously explained.

Whereas the crust former 10a more readily adapts to domestic use, the crust former 10b is especially adaptable for use in a bank of crust formers that may be arranged along a production line where crusts are formed within a plurality of containers by automatic or semiautomatic processes. Such an arrangement is illustrated diagrammetically in FIG. 7 in which a conveyor 34b is adapted to transport a plurality of containers 11b through a succession of stations at which empty containers each have a measured quantity of crust material deposited therein, a crust is formed from such material by operation of the crust formers 10b, filling is then added to the containers, and they are then moved through an oven or refrigerated area which bakes or chills the crust and filling in any desired and feasible manner.

Figure 7:
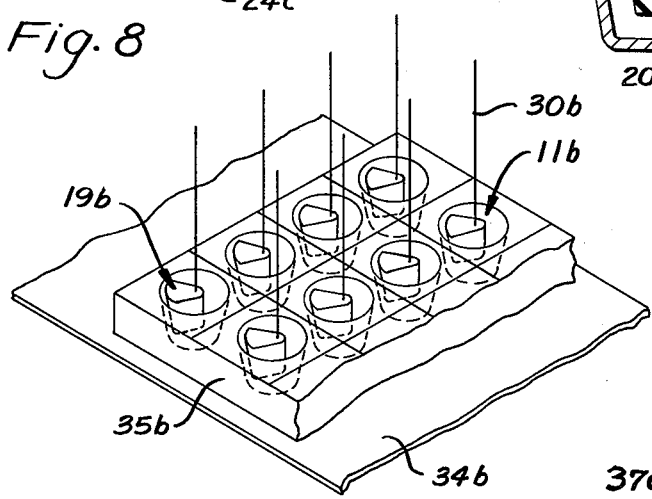
FIG. 7 is a diagrammatic view showing use of a bank of formers of the type illustrated in FIG. 6 arranged with a conveyor for production forming of crumb crust in containers therefor.

In the arrangement shown in FIG. 7 support means are provided for the containers, and in particular terms, a plurality of containers 11b are respectively positioned within cavities provided for that purpose in a platform or holder 35b supported upon the conveyor 34b so as to be transported thereby through the various stations heretofore described. At the crust forming station, a plurality of crust formers 10b arranged in a bank are carried by support means (represented by the shafts 30b) and they are lowered, or the containers raised, into operative association with the respectively aligned containers 11b, as shown in FIG. 7, and the forming heads 19b are then energized so as to be rotated relative to the containers (or the containers can be rotated relative to the heads) to construct crusts therewithin. The crust formers and heads 19b thereof can be accurately located relative to the containers 11b in any suitable manner as by guide or support means which, in the specific embodiment of the invention shown in FIG. 7, comprises the support shafts 30b and their positional relationship to the respectively aligned containers supported within the cavities therefor provided by the platform 35b. Thus, the heads are carried by suitable support means or structures in the sense of being positionally related thereby to the respectively associated containers. After the crusts are constructed, the bank of crust formers 10b is elevated, or the containers 11b lowered, to withdraw the forming heads 19b from the containers preparatory to a subsequent cycle of operation.

Figure 8:
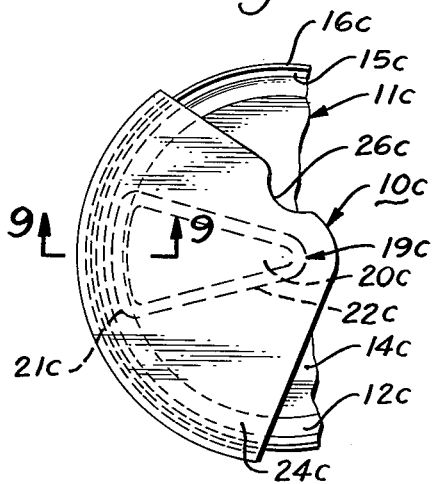
FIG. 8 is a broken top plan view of yet another embodiment of the crumb crust former shown in association with a container.
Figure 9:
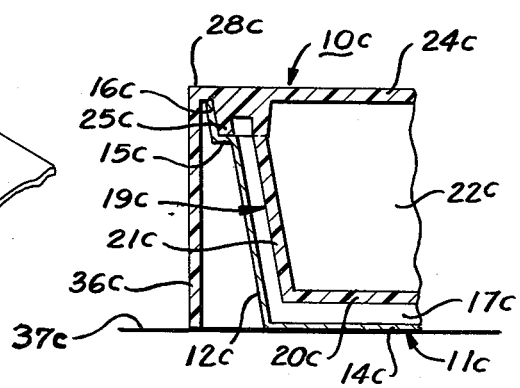
FIG. 9 is a broken transverse sectional view taken along the line 9—9 of FIG. 8.

The modified construction illustrated in FIGS. 8 and 9 is also generally similar to the embodiments of the invention heretofore considered although in general appearance it departs somewhat from the structural configurations of the prior-described embodiments of the invention. Nevertheless, evident overall functional and constructional identities pertain, and the same numerals are again used to identify respectively corresponding elements of both the container and crust former except that the suffix "c" has been used to differentiate this embodiment of the invention from those previously considered. Generally stated, and as is most evident in FIG. 9, the container 11c is essentially the same as those heretofore considered (but may be constructed without a flange and have curled or rolled edges). The crust former 10c cooperates therewith to construct a crust from a mass of crust forming material located within the container, all as previously described.

The forming head 19c of the crust former 10c is formed integrally with the support structure 24c so that relative rotation therebetween is not permitted. Accordingly, during use of the crust former 10c the container 11c and crust former, in its entirety, rotate relative to each other. The crust former 10c is also positionally related to the container 11c in the general manner of the aforementioned crust former 10a in that it has a depending flange 25c and an outwardly extending edge or flange 28c which respectively engage the rim 15c and flange 16c of the container.

As shown best in FIG. 8, the support structure 24c has an angular extent substantially less than 360° so that it overlies a somewhat pie-shaped portion of the container 11c, and along one of its generally radial edges it has a notch or recess 26c that facilitates gripping the same during use thereof. A depending skirt 36c (FIG. 9) extends downwardly from the support structure adjacent outwardly extending edge or flange 28c thereof, and such skirt is spaced outwardly from the depending flange 25c so as to enable the container flange 16c to be received in the space defined therebetween. Should any particular container not have such an upwardly extending flange 16c, the crust former 10c is nevertheless usable therewith, the space between the flange 25c and skirt 36c simply being void.

The skirt 36c is sufficiently long in a vertical sense that it rests upon a table top or other support surface 37, thereby enabling the container and crust former to be rotated relative to each other. In this embodiment of the invention, relative rotation is best effected by constraining the crust former 10c against rotation with the skirt 36c thereof firmly resting upon a support surface and by then rotating the container 11c relative thereto. The depending flange 25c wipes along substantially the entire lateral width of the container rim 15c thereby preventing accumulation of crumb crust material therealong. In the embodiment of the invention shown in FIGS. 6 and 7, it will be apparent that the support structure 24b also serves to prevent accumulation of crumb crust material along the rim 15b by being in engagement therewith throughout its entire extent.

In all embodiments of the invention, the crust formers are conveniently usable and function to distribute quickly and easily about the interior of a container a predetermined mass or measured quantity of crust forming material to construct a crust therefrom of uniform thickness along the bottom wall of the container and/or along the upwardly extending sidewall thereof. The upper edge of the crust thusly constructed is relatively clean and sharp because accumulation of the crumb crust material along the rim-equipped upper edge of the container is prevented by structure provided for this purpose. The crust formers are suited both for home or domestic use, and they are also adaptable to the quantity production required in commercial baking establishments.

Although each of the embodiments of the invention illustrated in the drawings discloses a head operative to distribute crust material along both the bottom and sidewalls of the associated container, as shown in FIG. 2, it should be understood that forming heads may be provided having different spatial relationships between the bottom and sidewalls thereof and the respectively facing bottom and sidewalls of the container with which it is used so that a crust may be formed along either the bottom or sidewall of the container and not along the other. For example, the forming head 19 shown in FIG. 2 may be sufficiently deep in its vertical dimension that the bottom wall 20 thereof essentially seats upon the upper surface of the container bottom wall 14. With such spatial relationship between the facing walls 14 and 20, the forming head will construct a crust only along the sidewall 12 of the container. Analogously, should the sidewall 21 of the forming head be in substantially contiguous relation with the sidewall 12 of the container, the crust constructed by the forming head would exist only along the container bottom wall 14.

The sidewall of the forming head, as previously explained, conforms substantially to the configuration of the facing sidewall of the associated container for an angular length sufficient to insure maintenance of the crust material along the container wall as the forming head moves past each section thereof. The forming head is movable, selectively, in opposite directions whenever the closure wall structure of the head provides two wall elements so that the head is able to plow or push the crust material in either direction. In the embodiment of the invention shown in FIGS. 6 and 7, the support means for the containers and for the forming heads are movable in generally vertical directions relative to each other and are also relatively rotatable so that as in the first instance, each forming head is enabled to be inserted into the container therefor and subsequently removed therefrom after the crusts are constructed and, in the second instance, to enable each forming head to be rotated relative to the associated container. The relative vertical movements of such means and the respectively associated heads and containers also constitute adjustment means in the sense that the positional relationship of each head with respect to the container is established by such means, and in the further sense that the relative positions of the heads and associated containers can be changed to vary crust thicknesses by varying the extent to which the heads are inserted into the containers.

It will further be apparent that forming heads of different types can be provided not only to change the aforementioned spatial relationship of the bottom wall and sidewall of the head with the respectively facing bottom wall and sidewall of the container, as previously explained, but also to conform the crust former to containers having different angles of inclination along the sidewalls thereof and/or different depths. Facility in interchangeability of heads is most evident in the embodiment of the invention shown in FIGS. 6 and 7, but it should be understood that in each embodiment of the invention, the heads may be removably and interchangeably related to the associated support structures.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. In a device for spreading material to form a crust in a container having a bottom wall, a peripheral side wall, an annular rim extending laterally from the upper edge of the side wall, and a cylindrical flange extending upwardly from the annular rim: a generally circular support plate adapted to overlie the container having a depending annular flange and a peripheral edge for engaging the rim of the container and the inner wall of the container flange in a manner permitting relative rotation of the support plate and container; and a forming head affixed to the support plate having bottom and side walls with arc lengths less than 360° facing the bottom and side walls of the container for spreading material to form a crust in the container upon relative rotation of the forming device and the container.

2. The crust forming device of claim 1 further including a wiper extending radially inwardly of the support plate flange for removing crust material from the rim of the container.

3. The crust forming device of claim 1 further including means affixed to the support plate to facilitate gripping of the crust forming device to effect relative rotation of the device and container.

4. In a device for spreading material to form a crust in a container having a bottom wall, a peripheral side wall, an annular rim extending laterally from the upper edge of the side wall, and a cylindrical edge extending from the annular rim: a support plate adapted to overlie at least a portion of the container, said support plate having a depending flange adapted to be disposed concentrically adjacent to the cylindrical edge to serve as a guide and permit relative rotation of the support plate and container about the center of the container; and a forming head affixed to the support plate having bottom and side walls with arc lengths less than 360° facing the bottom and side walls of the container for spreading material to form a crust in the container upon relative rotation of the forming device and the container.

5. The crust forming device of claim 4 wherein the support plate flange is of smaller diameter than the cylindrical edge.

6. The crust forming device of claim 4 wherein the support plate flange is of larger diameter than the cylindrical edge.

7. The crust forming device of claim 6 wherein the support plate flange extends below the bottom wall of the forming head whereby the bottom wall of the forming head is spaced a predetermined distance above the bottom wall of the container with the support plate flange and container resting on a supporting surface.

8. The crust forming device of claim 4 and further comprising means provided by said former preventing accumulation of crust material along the rim of such container.

9. The crust forming device of claim 8 in which said means includes a wiper fixedly related to said head for relative rotation therewith with respect to such container to engage and sweep the rim thereof to remove crust-material accumulation therefrom.

10. The crust forming device of claim 9 in which said head and support structure are fixed one to another to prevent relative rotation therebetween, and in which said wiper is carried by said support structure.

11. The forming device of claim 4 further including wall portions extending upwardly from the bottom wall along opposite end portions of the side wall of said head to enable the head and such container to be rotated relative to each other in either angular direction to construct a crust as aforesaid.

12. The crust forming device of claim 4 in which said head is substantially symmetrical along the side wall thereof to enable the head and such container to be rotated relative to each other in either angular direction to construct a crust as aforesaid, together with a wiper carried by said support plate and engagable with the container rim to sweep the same upon relative rotation of said head and such container to prevent crust material accumulating along the rim.

13. In a device for spreading material to form a crust in a container having a bottom wall and a peripheral side wall with an annular rim extending laterally from the upper edge of the side wall: a support plate adapted to overlie a portion of the container, said support plate having an arcuately extending depending flange for engaging the outer portion of the rim to serve as a guide and permit relative rotation of the forming device and container about the center of the container; and a forming head affixed to the support plate having a bottom wall and a side wall adapted to be positioned adjacent to the bottom and side walls of the container for spreading material to form a crust in the container upon relative rotation of the forming device and container.

14. The crust forming device of claim 13 further including a second arcuately extending depending flange spaced inwardly of the first named flange and adapted to engage another portion of the container rim.

15. The crust forming device of claim 13 wherein the support plate flange extends below the bottom wall of the forming head whereby the bottom wall of the forming head is spaced a predetermined distance above the bottom wall of the container with the support plate flange and container resting on a supporting surface.

16. The crust forming device of claim 13 further including a wiper constrained for rotation with the forming head for removing crust material from the rim of the container.

17. A crust former adapted for use with a container having an annular perimetric side wall extending upwardly from a bottom wall and equipped adjacent its upper edge with an outwardly projecting annular rim, comprising: a forming head relatively rotatable with respect to such container generally about the center thereof to distribute a mass of crust material along at least one of the walls of the container to construct a crust therein, said forming head having a bottom wall and an upwardly extending side wall respectively conforming to the general configurations of the bottom wall and side wall of such container and respectively adapted to be disposed in facing relation with the bottom wall and side wall of such container and further having a wall extending upwardly from the bottom wall of said head to serve as a crust material spreader, the bottom wall of said head being of sufficient length to extend generally from adjacency with the container side wall to at least the center portion of the container, the side wall of the forming head having an angular length less than 360°, the wall extending upwardly from said bottom wall including portions extending upwardly along opposite end portions of the side wall of the head for spreading crust material when the head and container are rotated relative to each other in either angular direction; and support structure connected with said head and engagable with the upper portion of the side wall of the container to positionally relate the forming head thereto and thereby establish a predetermined positional relation of the bottom wall and side wall of the forming head with the respectively facing bottom wall and side wall of the container, said support structure comprising a plate-like member adapted to overlie at least a portion of the container and rim thereof and being equipped with a fingerhold there along; said head and said container being relatively rotatable to effect construction of a crust within the container.

18. The crust former of claim 17 further including means connected with the forming head for wiping crust material from a portion of the upper portion of the side wall of the container.

19. The crust former of claim 17 in which said plate-like support structure has an angular length of 360° so as to define a cover over such container, and further comprising means in the form of a wiper carried by said support structure and engageable with the container rim to sweep the same upon relative rotation of said head and such container to prevent accumulation of crust material along the rim thereof.

20. The crust former of claim 19 in which said support structure has a depending annular flange substantially narrower than the rim of such container and supportingly engageable therewith, in which said wiper is a relatively small component extending inwardly from said flange to overlie a restricted area of such rim, and in which the rim of the aforementioned container terminates in an upwardly oriented annular flange coaxially circumjacent the support structure flange when said crust former is positionally related to such container.

21. The crust former of claim 19 in which the rim of such container terminates in an upwardly oriented annular flange, in which said support structure has an outer permimetric edge portion adapted to overlie such flange, and in which said support structure further has a depending annular flange adapted to overlie such rim throughout its angular extent and define the aforesaid wiper, the flange of such container being coaxially circumjacent the support structure flange when said former is positionally related to such container.

22. The crust former of claim 17 in which said support structure has a depending skirt adjacent the outer edge thereof for engagement with a support surface, and in which said support structure is equipped with means in the form of a wiper engageable with a container rim to sweep the same upon relative rotation of said head and such container to prevent accumulation of crust material along the container rim.

23. A crust former adapted for use with a container having an annular perimetric side wall extending upwardly from a bottom wall and equipped adjacent its upper edge with an outwardly projecting annular rim, comprising: a forming head relatively rotatable with respect to the container generally about the center thereof to distribute a mass of crust material along at least one of the walls to construct a crust therein, said forming head having a bottom wall and an upwardly extending side wall respectively conforming to the general configurations of the bottom wall and side wall of the container and respectively adapted to be disposed in facing relation with the bottom wall and side wall of the container and further having a wall extending upwardly from the bottom wall of said head to serve as a crust material spreader, the bottom walll of said head being of sufficient length to extend generally from adjacency with the container side wall to at least the center portion of the container, the side wall of the forming head having an angular length less than 360°; support structure connected with the forming head and engageable with the upper portion of the side wall of the container to positionally relate the head thereto and thereby establish a predetermined positional relation of the bottom wall and side wall of the head with the respectively facing bottom wall and side wall of the container, said support structure comprising a plate having an angular length of 360° adapted to overlie the rim and container to form a cover over the latter; said head and said container being relatively rotatable to effect construction of a crust within the container; and means provided by said support structure to sweep along the rim of the container upon relative rotation of the head therewith to prevent accumulation of crust material along the container rim.

24. The crust former of claim 1 wherein the forming head includes an upstanding wall extending between the lateral margins of the side wall and the bottom wall of the forming head.

25. The crust former of claim 4 wherein the forming head includes an upstanding wall extending between the lateral margins of the side wall and the bottom wall of the forming head.

* * * * *